United States Patent [19]

Gosse et al.

[11] Patent Number: 4,718,572
[45] Date of Patent: Jan. 12, 1988

[54] DEVICE FOR HALF-OPENING THE DOOR OF A BOX CONTAINING SAFETY EQUIPMENT, SUCH AS OXYGEN MASKS

[75] Inventors: Dominique Gosse, Le Chesnay; Gérard Silber, Chilly-Mazarin, both of France

[73] Assignee: Societe de Fabrication d'Instruments de Mesure (S.F.I.M.), France

[21] Appl. No.: 894,790

[22] Filed: Aug. 8, 1986

[30] Foreign Application Priority Data

Aug. 8, 1985 [FR] France ........................... 85 12162

[51] Int. Cl.⁴ ............................................. B65D 45/16
[52] U.S. Cl. ..................................... 220/324; 292/246
[58] Field of Search ....... 292/246, 249, 204, DIG. 31; 220/324

[56] References Cited

U.S. PATENT DOCUMENTS

| | | | |
|---|---|---|---|
| 3,259,411 | 7/1966 | Griffiths | 292/DIG. 31 |
| 3,503,394 | 7/1968 | Hotz et al. | 128/146.4 |
| 4,518,179 | 5/1985 | Fenner | 292/166 |

FOREIGN PATENT DOCUMENTS 0151063  1/1985  France .

*Primary Examiner*—Stephen Marcus
*Assistant Examiner*—Nova Stucker
*Attorney, Agent, or Firm*—Gifford, Groh, VanOphem, Sheridan, Sprinkle and Dolgorukov

[57] ABSTRACT

A device for half-opening the door of a box containing safety equipment such as oxygen masks, said device enabling said door to be held in a partially open position for inspection purposes without releasing the safety equipment, said device being constituted by a half-opening member hinged to said door about a transverse axis, said half-opening member having an operating portion on one side of said axis and a latching portion on the other side of said axis, said operating portion, when in a normal position, closing an associated opening through said door, and said latching portion, when in an inspection position, co-operating with a latching member fixed inside said box.

16 Claims, 7 Drawing Figures

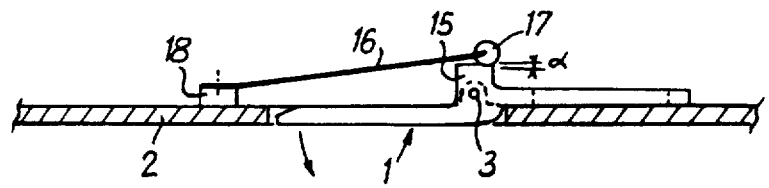
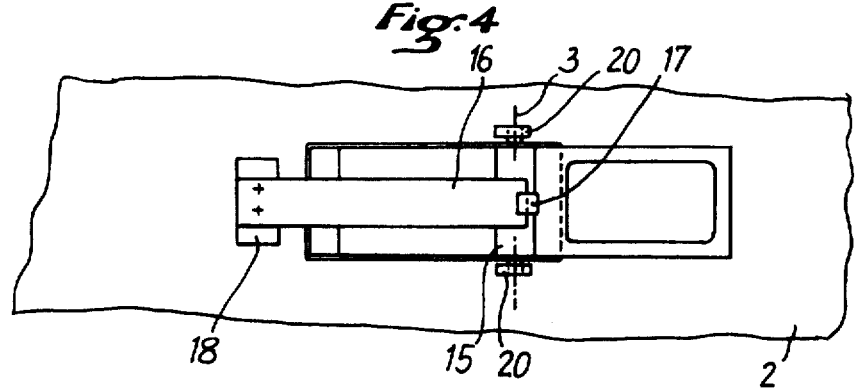
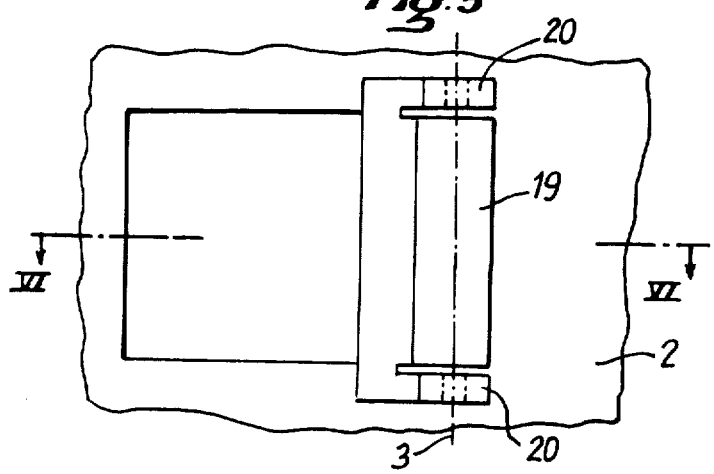
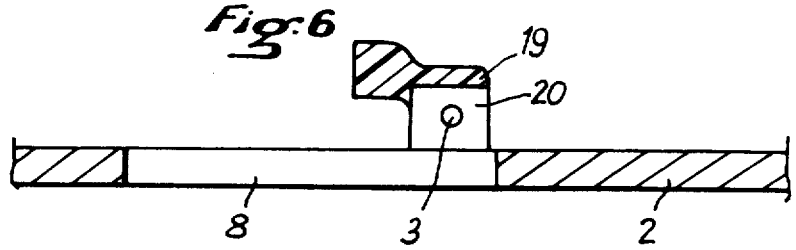

DEVICE FOR HALF-OPENING THE DOOR OF A BOX CONTAINING SAFETY EQUIPMENT, SUCH AS OXYGEN MASKS

The invention relates to a device for half-opening the door of a box containing safety equipment, and is intended most particularly for the boxes which contain oxygen masks on board airliners.

BACKGROUND OF THE INVENTION

Such boxes are conventionally provided in aircraft having pressurized cabins in order to provide each passenger with an oxygen mask in the event of an accident leading to a drop in the pressure inside the cabin. Special boxes are thus provided close to the passenger seats, each containing a plurality of masks together with an associated chemical oxygen cartridge or manifold, said cartridge coming into operation when the door of the box is fully opened.

The box may be fully opened automatically or manually by means of a suitable device, and the masks resting on the inside face of the door then fall down and remain suspended at the ends of their supply pipes ready for immediate use by the passengers. Automatic opening by electric or pneumatic means is naturally preferred and may be directly controlled from onboard altimeter equipment. Opening devices are then used of the kind described in published European patent application No. 0 151 063, and such automatic devices must be checked or verified periodically to ensure that they are still operating properly.

Visual inspection may be performed at the same occasion to verify that the oxygen cartridges are operating properly (e.g. by means of an indicator pellet or a circular band).

A distinction is thus commonly drawn between ground inspections of the kind performed every 8000 flying hours, for example, and complete overhauls during which the entire equipment is thoroughly checked, of the kind performed every 12,000 flying hours, as a rule.

It is common practice to provide a device for use during routine maintenance to half open the door and hold it in a position which prevents the masks from falling out, since properly re-packing the masks is a long and tediuos job. The device of half-opening the door must be inconspicuous and relatively difficult to grasp in order to avoid drawing the attention of passengers who might be tempted to operate it.

Presently used devices for half-opening the door (see for example U.S. Pat. No. 4,518,179) are rotatable telescopic systems having a return spring and a bayonet-type latching mechanism. A plate is thus fixed against the far face of the box and carries a slide rod which is terminated by a rectangular block having its outwardly-directed face surrounded by a narrow peripheral rim enabling it to be grasped. An operator must thus use a fingernail or other tool to pull the block against the return force exerted by the spring and then, once the block has been pulled away from the door, the operator must turn it through about 90°, thereby enabling it to perform its main function of holding the door half-open.

These devices are robust and very reliable, however they are bulky since the associated plate occupies a certain amount of room inside the box. Bulk is becoming an every-increasing problem particularly when up to eight masks are to be stored in a single box. In addition, operating such devices is not always very easy since the peripheral rim eventually gets worn, making it progressivelly more difficult to graps. Further, the operation is a two-part movement: the block must initially be pulled perpendicularly away from the plane of the door against the return force of the coaxial spring around the rod which holds the block, and then the block must be rotated when fully extended in order to engage the bayonet-type latching mechanism.

Another prior technique consists in providing an independent inspection hatch enabling visual inspection to be performed while leaving the main door in its closed position (see, for example, U.S. Pat. No. 3,503,394). Devices for half-opening doors are frequently preferred to indpendent inspection hatches, either for reasons of expense or else for reasons of convenience.

Preferred implementations of the present invention provide a device for half-opening a door and having a structure which is easy to operate and which occupies relatively little room.

Preferred embodiments of the invention also make it possible to provide access via a larger opening, in particular making it easy to open the box manually in the event that the automatic system does not operate properly.

Preferred embodiments of the invention provide a device for half-opening the door using a minimum of parts, with said parts being simple in structure and capable of being molded.

SUMMARY OF THE INVENTION

The present invention provides a device for half-opening the door of a box containing safety equipment such as oxygen masks, said device enabling said door to be held in a partially open position for inspection purposes without releasing the safety equipment, said device being constituted by a half-opening member hinged to said door about a transverse axis, said half-opening member having an operating portion on one side of said axis and a latching portion on the other side of said axis, said operating portion, when in a normal position, closing an associated opening through said door, and said latching portion, when in an inspection position, cooperating with a latching member fixed inside said box.

Preferably, said operating portion is in the form of a plate, whereas said latching portion is hollow and constitutes a loop.

In order to avoid drawing the attention of passengers and spoiling the apperance of an aircraft cabin, said operating portion, when in its normal position, is advantageously integrated in the thickness of said door, with said latching portion being disposed inside said box.

In order to facilitate operating such an operating portion, the end of said operating portion furthest from said axis is advantageously tapered.

Preferably, said operating portion and said latching portion occupy two parallel planes which are offset from each other, thereby providing an abutment in said normal position by means of said latching portion. The hinged half-opening member may then rotate between its normal position and its inspection position through an angle of about 90°.

Advantageously, the device further includes resilient means fixed to the door on its inside surface and disposed to hold said hinged half-opening member in at least one of its extreme positions, said resilient means may, in particular, cooperate with the middle of the hinged half-opening member in the vicinity of said transverse axis about which it is hinged, thereby enabling it to exert a return couple towards the normal position of the hinged half-opening member.

By way of example, said resilient means may be constituted by a resilient blade carrying a presser wheel in the vicinity of its free end. Alternatively, said resilient means may be constituted by a resilient tab interconnecting lugs fixed to the door and provided to receive a shaft constituting said transverse axis about which said half-opening member is hinged. A third variety of resilient means is constituted by a part of said latching portion itself located close to the middle of said half-opening member.

In a particularly simple embodiment, the hinged half-opening member has two outwardly projecting pegs constituting its hinge shaft, said member being constituted by a one-piece molding.

BRIEF DESCRIPTION OF THE DRAWINGS

Embodiments of the invention are described with reference to the accompanying drawings, in which:

FIGS. 3 and 4 are respectively a section and a plan view showing a device in accordance with the invention and including resilient means in the form of a blade with a presser wheel;

FIGS. 5 and 6 are respectively a plan view and a section on a line VI—VI showing a special support for the hinged member where said resilient means are constituted by said support.

MORE DETAILED DESCRIPTION

Figure 1:
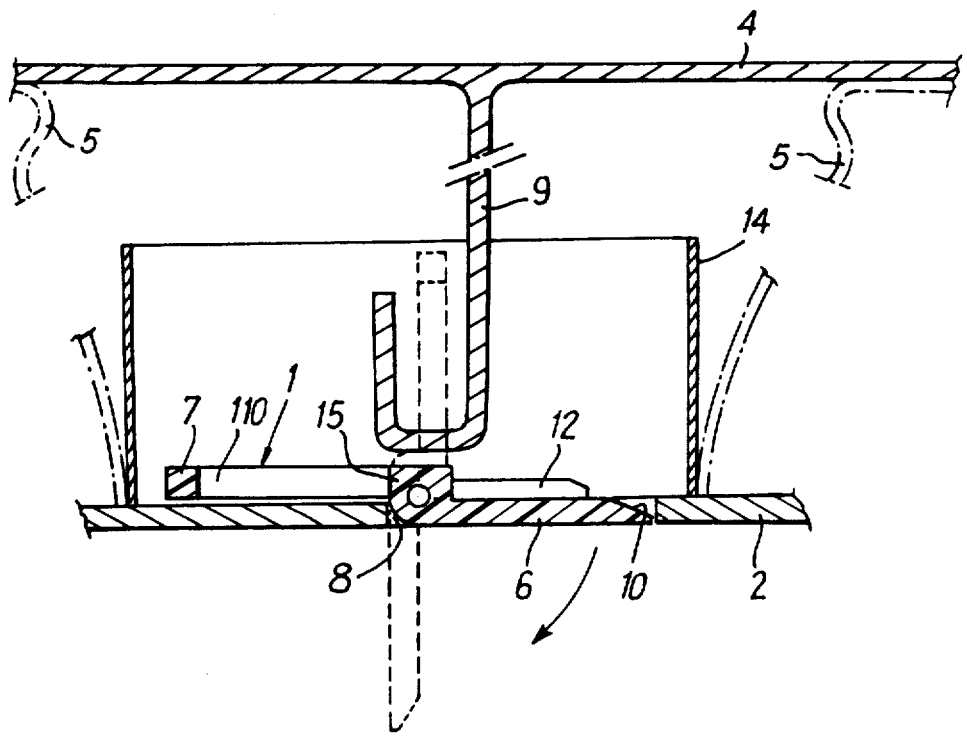
FIG. 1 is a section through a device for half-opening a door in accordance with the present invention.
Figure 2:
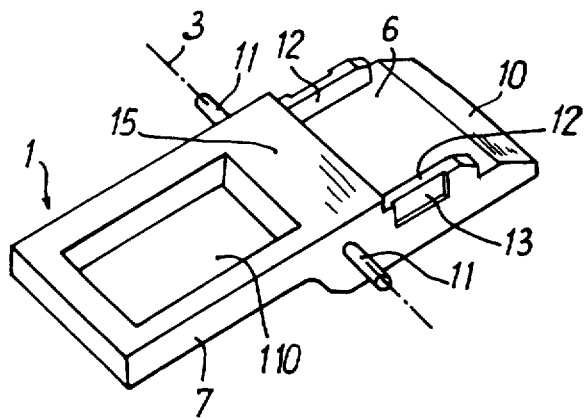
FIG. 2 is a perspective view of the hinged half-opening member shown in FIG. 1, with an operating portion having two longitudinal label-carrying ribs.

The device for half-opening a door shown in FIGS. 1 and 2 is essentially constituted by a half-opening member 1 hinged to a door 2 of a box 4 which contains safety equipment such as oxygen masks. The member 1 is hinged about a transverse axis 3. The face of the box 4 which is furthest from the door 2 when in its closed or normal position leaves a space large enough for receiving oxygen masks which are shown diagrammatically at 5 in FIG. 1. The hinged member 1 comprises an operating portion on one side of the transverse axis 3 and a latching portion 7 on the other side of said axis 3. Said operating portion 6, when in its normal position closes an associated opening 8 through the door 2, and said latching portion 7, when in an inspection position, co-operates with a latching member 9 fixed to the inside of said box 4.

The operating portion 6 is in the form of a plate which is received in the thickness of the door 2 when the hinged member 1 is in is normal position (as shown by solid lines in FIG. 1). This avoids drawing passenger attention and does not spoil the appearance of the box 4 since the bottom face of the plate is level with the bottom face of the box 4 when the plate is in its closed position. In order to make operating the hinged member 1 easier, the end 10 of the operating portion 6 furthest from the axis 3 is preferably tapered so as to facilitate inserting a fingernail or other tool. The latching portion 7 is hollow to form a loop or link with a central opening 110 suitable for receiving the active portion of the latching member 9 when the hinged member 1 is caused to rotate through about 90° from its normal position to its inspection position (shown by dashed lines in FIG. 1). When the hinged member 1 is in its inspection position (i.e. after it has been tilted through 90° by an operator) the door 2 naturally begins to open under the weight of the safety equipment supported by the door 2, and the door 2 continues to move downwardly until the loop hooks onto the latching member 9, thereby holding the door 2 in a half-opened position. As can be seen in FIG. 2, the hinged member 1 has two outwardly projecting side pegs 11 constituting a shaft about which said member 1 is free to rock, said pegs 11 being received in gusset plates or legs provided on the inside face of the door 2 (not visible in FIG. 1). The operating portion 6 and the latching portion 7 thus occupy two planes which are substantially parallel and offset from each other so that when in the normal position the loop constitutes an abutment for the hinged member 1 merely by bearing against the inside face of the door 2. Ribs 12 may optionally be provided on the operating portion plate 6 in order to reinforce it and to facilitate supporting a label inserted in a side slot 13 of such ribs. Such labels are commonly used to draw the operator's attention and indicate that the half-opening device is ready to perform its function. It may be observed in FIG. 1 that a partition 14 is provided around the half-opening device, and that this partition 14 serves to prevent the masks 5 from hindering operation of the hinged member 1.

The hinged member 1 is particularly easy to operate and may be made as a one-piece molding, preferably of plastic. In accordance with an important aspect of the inspection, the half-opening deice may include resilient means fixed to the inside face of the door 2 and serving to maintain the hinged member 1 in at least one of its extreme positions. Naturally, it is more important to hold the hinged member 1 in its normal position since it is necessary to prevent the hinged member 1 from rattling when the aircraft is subjected to vibration, since such rattling would be sure to attract passenger attention. Various types of resilient means may naturally be used, and the examples described below have been selected for their simplicity, reliability, and small volume.

Preferably, the resilient means co-operate with the middle zone 15 of the hinged member 1 in the vicinity of its hinge axis 3. This middle zone 15 may have bearing facets provided for the purpose, and in particular it may have two substantially orthogonal facets for "marking" the two extreme position of the device. In FIG. 1, the latching member 9, or more particularly that portion thereof which is adjacent to the middle zone 15, constitutes an example of such resilient means (in practice, the gap between the middle of the hinged member 1 and the bottom of the latching member 9 would be smaller than shown, but an exaggeratedly large gap is shown in order to simplify understanding). In this case the latching member 9 performs two functions: not only does it have a hook-shaped portion which latches into the opening of the loop, but it also provides a resilient return function by virtue of its own resilience. Preferably, the resilient means co-operate with the middle zone 15 of the hinged member 1 in the vicinity of the hinged axis 3, and are in thrust contact against said middle zone 15 in a disposition which enables a return couple to be exerted towards the normal position of said hinged member 1. The return couple is difficult to verify when the resilient means are constituted by the latching member 9 itself: the variant resilient means described below make it much easier to provide such a return couple.

Thus, in FIGS. 3 and 4, a resilient spring blade 16 is provided with a presser wheel 17 located near its free end, while the other end of the blade 16 is fixed to the door 2, e.g. by means of a support 18. It will readily be understood that the overcenter position of the wheel 17 relative to the hinge axis 3 of the hinged member 1 easily provides a return couple towards the normal position. It may be advantageous to provide a top face in the middle zone 15 which slopes at an angle α (e.g. of about 5°), thereby further reinforcing the effect of the spring blade 16 when the hinged member 1 is in its normal position.

In FIGS. 5 and 6, the resilient means are essentially constituted by a resilient tab 19 which interconnects lugs 20 which are fixed to the door 2 and are provided for receiving the shaft constituting the hinge axis 3 of the hinged member 1 (and in particular for receiving the pegs 11 shown in FIG. 2). This support element is easily made of molded plastic material. This particularly simple variant gives maximum possible access to the inside of the box 4 via the opening 8 when the half-opening device is in its inspection position.

Naturally, the support 18 may be disposed at the loop opening level, with the spring blade 6 then being in a position which is substantially symmetrical to that shown in FIGS. 3 and 4. In this disposition, the blade 16 is no longer over the opening 8 through the door 2 and thus the operator has clear access through the opening 8 to the inside of the box 4 when the half-opening device is in its inspection position.

Figure 7:
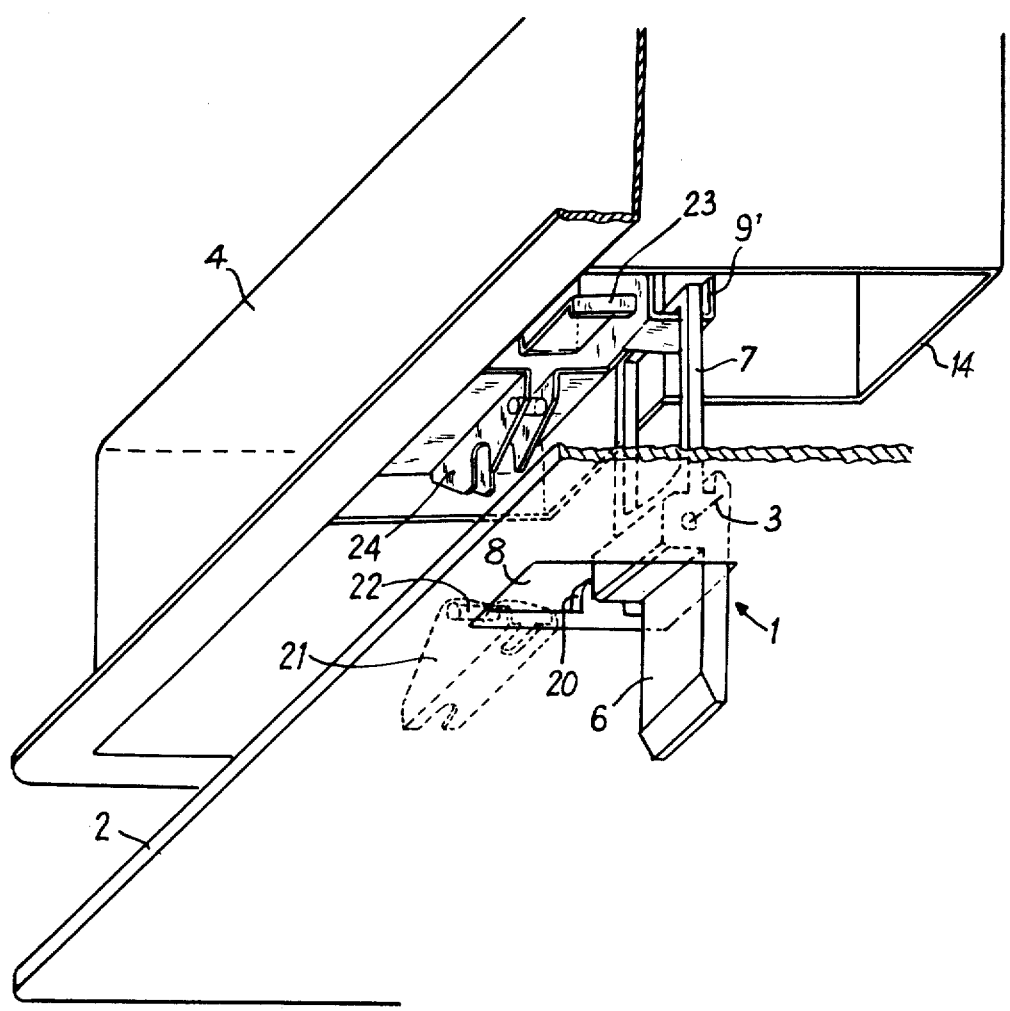
FIG. 7 is a partially cut-away perspective view showing a variant device in accordance with the invention in which the disposition of the hinged member is suitable for easily resetting locking means.

The variant of the invention shown in FIG. 7 is close to that shown in the preceding figures. However, the hinge axis 3 for the hinged member 1 now lies substantially parallel to the hinge axis of the mask box 4. The box 4 receives an opening control device of which only some of the components are shown in the figure. A fork 21 supports a locking lug 22 on the inside surface of the door 2, and the lug 22 co-operates with a locking mechanism including two plates 24. This device also includes a manual re-setting lever 23 together with a manual opening lever which is normally provided as an additional safety precaution in case the automatic device fails to work. The automatic opening device does not constitute a part of the present invention, but reference may usefully be made to published European patent application No. 0 151 063 in which its structure is described in greater detail. It should be observed that the latching member 9' is fixed in the present case to a bolt (obtained by folding a lug cut out from the same sheet as the bolt), thereby providing a structure which is particularly easy to make, and above all ensuring that the openign 8 provides free access to the bolt when the hinged member 1 is in its inspection position. This is particularly advantageous since, if the door remains closed because of the automatic operating system failing to operate properly (regardless of whether it is electrically or pneumatically operated), the half-opening device can be used to provide direct access to the bolt, and thereby allow the door 2 to be opened manually. Also, when the door 2 is half-open, the bolt may be closed manually without requiring a special tool (in either case this makes it possible to avoid providing an extra hole through the door 2 as is currently required with present half-opening devices, and this further simplifies the structure and improves the appearance of the assembly).

In any event, a half-opening device in accordance with the invention is easy to operate and, in particular, it only requires a single tilting movement to be operated, unlike prior devices, furthermore its simple structure can be made cheaply by virtue of the small number of parts required.

Naturally the invention is not limited to the embodiments described above, but extends to any variants using equivalent means and falling within the scope of the claims.

In particular, the shape of the hinged member is not critical and the flat rectangular shape shown is merely representative of one suitable shape. Similarly, the person skilled in the art will readily be able to design other type of resilient means for holding the hinged member in at least one of its extreme positions.

We claim:

1. A device for partially opening the door of a compartment containing safety equipment such as oxygen masks, said device comprising:

an opening member pivotably secured to the door about a transverse axis parallel to the door and across an associated opening in the door, said opening member having an operating portion disposed to one side of said axis and a latching portion disposed substantially diametrically opposite said operating portion, wherein said opening member is pivotable between at least a normal position in which said operating portion closes the associated opening in the door, and an inspection position in which the door is held in a partially open position without releasing the enclosed safety equipment; and a latching member attached to the compartment for engaging said latching portion when said opening member is in said inspection position to thereby hold the door in a partially open position.

2. A device according to claim 1, wherein said operating portion is in the form of a plate, wherein said latching portion is hollow and constitutes a loop.

3. A device according to claim 1, wherein said operating portion, when in its normal position, is integrated in the thickness of said door, with said latching portion being disposed inside said box.

4. A device according to claim 3, wherein the end of said operating portion furthest from said axis is tapered.

5. A device according to claim 1, wherein said operating portion and said latching portion occupy two parallel planes which are offset from each other.

6. A device according to claim 1, wherein the hinged opening member rotates between its normal position and its inspection position through an angle of about 90°.

7. A device according to claim 1 further including resilient means disposed to hold said hinged opening member in at least one of its normal and inspection positions.

8. A device according to claim 7, wherein said resilient means co-operates with a middle of the hinged opening member in the vicinity of said trasnverse axis about which it is hinged.

9. A device according to claim 8, wherein said resilient means presses against said middle portion of the hinged opening member and exerts a return couple to move the opening member towards the normal position.

10. A device according to claim 8 wherein said resilient means comprises a resilient blade fixed at one end to the door and carrying a presser wheel in the vicinity of a free end, said presser wheel coacting with said middle portion.

11. A device according to claim 8, wherein said resilient means comprises a resilient tab disposed between a pair of lugs fixed to the door on opposite sides of said opening, said lugs being provided to receive a shaft constituting said transverse axis about which said opening member is hinged, and said resilient tab being adapted to cooperate with said middle portion.

12. A device according to claim 8 wherein said resilient means comprises a part of said latching portion itself located close to the middle portion of said opening member.

13. A device according to claim 1 wherein said hinged opening member comprises a one-piece molding, said opening member having two outwardly projecting pegs, coaxial with said transverse axis.

14. A device according to claim 9 wherein said resilient means comprises a resilient blade fixed at one end to the door and carrying a presser wheel in the vicinity of a free end, said presser wheel coacting with said middle portion.

15. A device according to claim 9 wherein said resilient means comprises a resilient tab disposed between a pair of lugs fixed to the door on opposite sides of said opening, said lugs being provided to receive a shaft constituting said transverse axis about which said opening member is hinged, and said resilient tab being adapted to co-operate with said middle portion.

16. A device according to claim 9 wherein said resilient means comprises a part of said latching portion itself located close to the middle portion of said opening member.

* * * * *

UNITED STATES PATENT AND TRADEMARK OFFICE
CERTIFICATE OF CORRECTION

PATENT NO. : 4,718,572

DATED : January 12, 1988

INVENTOR(S) : Dominique Gosse et al

It is certified that error appears in the above-identified patent and that said Letters Patent is hereby corrected as shown below:

Col. 1, line 47, delete "tediuos" and insert --tedious--;

delete "of", and insert -- for --.

Col. 2, line 3, delete "progressivelly" and insert --progressively--;

delete "graps" and insert --grasp--.

Col. 3, line 51 after "portion", add --6--.

Col. 4, line 36, delete "deice" and insert --device--.

line 52, delete "position" and insert --positions--.

Col. 6, line 62 after "middle", insert --portion--.

Signed and Sealed this

Seventh Day of June, 1988

*Attest:*

DONALD J. QUIGG

*Attesting Officer*  *Commissioner of Patents and Trademarks*